Patented June 21, 1938

2,121,011

UNITED STATES PATENT OFFICE 2,121,011

STABILIZING VINYLIDENE CHLORIDE

Edgar C. Britton and Walter J. Le Fevre, Midland, Mich., assignors to The Dow Chemical Company, Midland, Mich., a corporation of Michigan No Drawing. Application April 24, 1937, Serial No. 138,732

5 Claims. (Cl. 23—250)

This invention relates to methods of stabilizing vinylidene chloride, $H_2C=CCl_2$, and to the improved composition thereby obtained.

When vinylidene chloride is exposed to the action of air and light, a gradual polymerization takes place with the formation of resinous products. The formation of such polymeric compounds is desirable in the preparation of plastics, but it is necessary that the material be stabilized, at least temporarily, against such polymerization, so that it can be stored for a period of time following its preparation, and prior to its use in resin formation. It is, therefore, among the objects of this invention to provide a process for inhibiting the polymerization of vinylidene chloride. A further object of the invention is to provide a relatively stable monomeric vinylidene chloride. Another object of the invention is to provide a stabilized vinylidene chloride composition from which the stabilizing agent can be readily removed when desired.

We have discovered that vinylidene chloride can be stabilized against the action of air and light by incorporating therewith one or a combination of certain diaryl alkylene diamines, and, furthermore, that these stabilizing agents can again be readily separated from the vinylidene chloride to render the same capable of polymerization.

The concentration of stabilizing agent to be employed in monomeric vinylidene chloride may be varied, depending upon the length of time for which is desired to stabilize the compound and upon the effectiveness of the particular agent employed. We have found that an amount of stabilizing agent equivalent to 10 per cent or less of the weight of vinylidene chloride is ordinarily sufficient to maintain the vinylidene chloride in monomeric form over extended periods of time. When using the herein-described diaryl alkylene diamines as stabilizing agents, we have determined that between about 0.25 and about 1 per cent of such material dissolved in or suspended in vinylidene chloride serves to prevent polymerization for several weeks.

Among the diaryl alkylene diamines which we employ are diphenyl ethylene diamine, ditolyl ethylene diamine, dixylyl ethylene diamine, diphenyl propylene diamine, ditolyl propylene diamine, etc. Other diaryl alkylene diamines, i. e. compounds formed by the interaction of alkylene halides with such aryl amines as aniline, toluidine, xylidine, etc., are also effective as stabilizing agents for vinylidene chloride.

In a preferred method of carrying out our invention, a small amount of one of the stabilizing agents mentioned above, suitably one per cent, or less, based on the weight of vinylidene chloride, is added to freshly distilled monomeric vinylidene chloride, which may then be stored in a container. When it is desired to utilize the stabilized vinylidene chloride in polymerization processes, the stabilizing agent may be readily and completely removed from the solution by distilling off the lower boiling vinylidene chloride. The stabilizing agent is left in the still as a residue after the distillation, and is adapted to be reemployed for the stabilization of further amounts of vinylidene chloride. The vinylidene chloride removed from the stabilizer by distillation is found to polymerize readily when exposed to light, air, elevated temperature, or other of the customary catalysts or accelerators for the polymerization.

The following example serves to illustrate the practice of our invention:

99.5 grams of vinylidene chloride were placed in each of 6 flasks. To 5 of the samples there was added 0.5 gram of one of the new stabilizing agents, namely, diphenyl ethylene diamine, ditolyl ethylene diamine, dixylyl ethylene diamine, diphenyl propylene diamine, ditolyl propylene diamine, etc. The samples were allowed to stand at room temperature and in contact with the air for a period of 2 weeks, at the end of which time no polymerization or oxidation of the vinylidene chloride could be detected. In each instance, the vinylidene chloride distilled readily from the stabilizing agent and was thereafter readily polymerized. The untreated sample of freshly distilled vinylidene chloride was found to have polymerized substantially completely after standing for 24 hours at room temperature and in contact with air. After having stood for only 5—6 hours, this untreated sample displayed evidence of polymerization and of oxidation, there being readily detected the odor of phosgene, one of the normal oxidation products of vinylidene chloride. Attempts to recover the vinylidene chloride from the polymerized untreated sample thereof resulted only in further oxidation and decomposition.

Other modes of applying the principle of our invention may be employed instead of those explained, change being made as regards the materials employed, provided the step or steps or the products recited in the following claims be thereby carried out or obtained.

We therefore particularly point out and distinctly claim as our invention:—

1. Vinylidene chloride containing up to 10 per cent by weight of a compound selected from the group consisting of diphenyl ethylene diamine, ditolyl ethylene diamine, dixylyl ethylene diamine, diphenyl propylene diamine, and ditolyl propylene diamine.

2. Vinylidene chloride stabilized with a compound selected from the group consisting of diphenyl ethylene diamine, ditolyl ethylene diamine, dixylyl ethylene diamine, diphenyl propylene diamine, and ditolyl propylene diamine.

3. Vinylidene chloride stabilized with diphenyl ethylene diamine.

4. Vinylidene chloride stabilized with ditolyl ethylene diamine.

5. Vinylidene chloride stabilized with diphenyl propylene diamine.

EDGAR C. BRITTON.
WALTER J. LE FEVRE.